F. P. LOVEJOY.
MILLING TOOL.
APPLICATION FILED AUG. 30, 1918.
1,311,452. Patented July 29, 1919.
Fig. 1. Fig. 2.
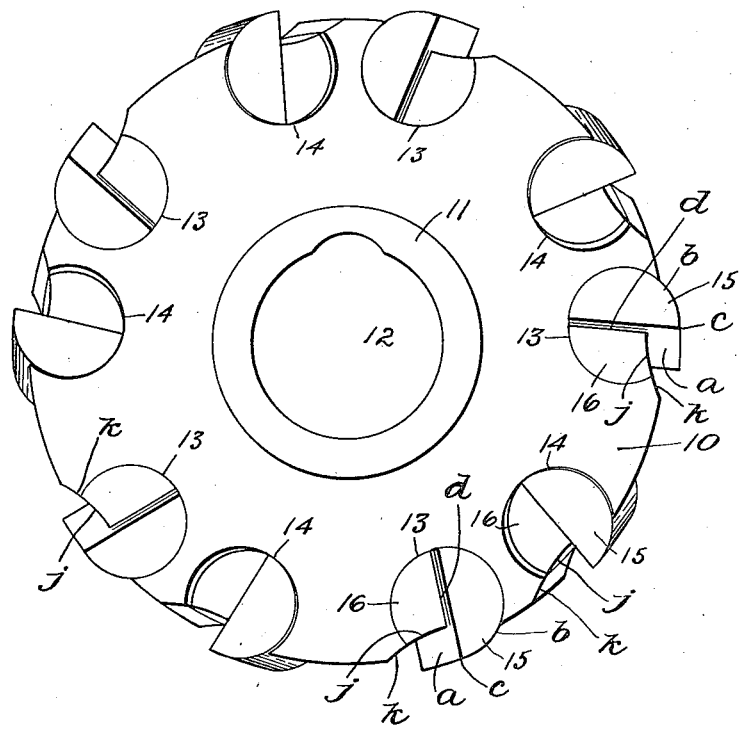
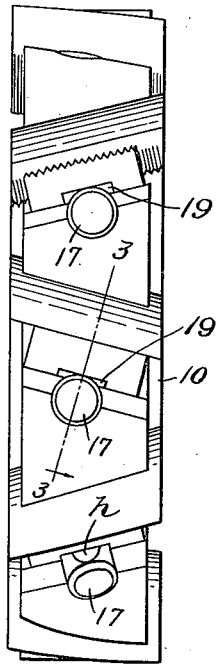
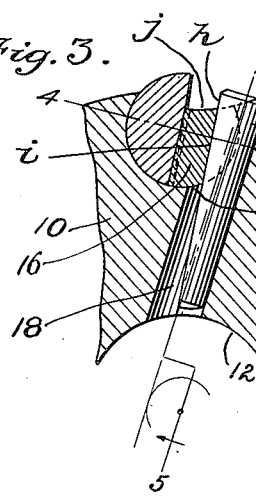
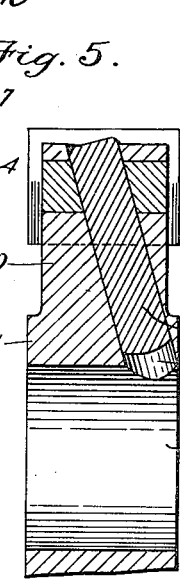
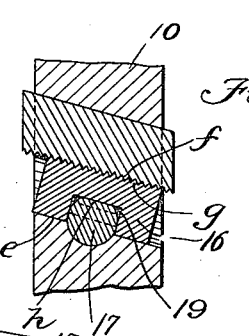
Inventor
Fred P. Lovejoy
Attorneys

UNITED STATES PATENT OFFICE.

FRED P. LOVEJOY, OF SPRINGFIELD, VERMONT.

MILLING-TOOL.

1,311,452.  Specification of Letters Patent.  Patented July 29, 1919.

Application filed August 30, 1918. Serial No. 252,107.

*To all whom it may concern:*

Be it known that I, FRED P. LOVEJOY, a citizen of the United States, residing at Springfield, in the county of Windsor and State of Vermont, have invented new and useful Improvements in Milling-Tools, of which the following is a specification.

This invention consists of a milling tool having certain novel features of construction and arrangement of parts which are illustrated upon the accompanying drawings, described in the following specification, and particularized in the appended claims.

Referring to the drawings,—

Figure 1 represents a face view of the rotary milling tool embodying the invention.

Fig. 2 represents a side elevation of the same.

Fig. 3 represents a section on the line 3—3 of Fig. 2.

Fig. 4 represents a section on the line 4—4 of Fig. 3.

Fig. 5 represents a section on the line 5—5 of Fig. 3.

The invention comprises a rotary body or cutter holder, which is circular in face view, and which is provided in its periphery with a plurality of semi-cylindrical sockets extending from face to face thereof, in each of which sockets there are located a cutter and a shoe for holding the cutter in position, each shoe itself being locked by a wedge pin which is arranged transversely thereto.

The disk-like circular body or cutter holder is indicated at 10 and its hub 11 has a central bore or aperture 12 so that the body may be secured upon a suitable spindle. In the periphery of the body there are a plurality of transverse concave or semi-cylindrical sockets, which as shown may be arranged in pairs as indicated at 13, 14. The axes of each pair of sockets are convergent, forming an acute angle, although this is not a matter of necessity, as the axes could all be parallel with the axis of the body if desired. In each socket there is placed a cutter 15 having a flat face *a* and a curved or peripheral wall *b*, the latter fitting the concave wall of the socket. Each cutter constitutes approximately one-half of a cylinder whose radius is equal to that of the socket in which it is located, and the angle formed by the face *a* with the peripheral wall *b* provides a cutting edge *c*. When set in its socket, the cutting edge projects some distance outwardly beyond the periphery of the body 10. Each cutter 15 is held in place by a shoe 16, which is complemental thereto, having a face *d* to engage the flat face *a* of the cutter and having a curved peripheral wall *e* to engage the wall of the socket. Preferably each cutter 15 projects endwise beyond the end faces of the body, as shown in Figs. 2 and 4, whereas the shoe 16 is of such dimensions that it does not so project. The end faces of the cutter are preferably parallel with the end faces of the body and are therefore at an angle of other than 90° to the axis of the cutter, but the shoes 16 preferably have faces which are perpendicular to their axes, as indicated in Fig. 4. Each cutter and its associated shoe have complemental teeth *f* and *g* respectively on their contacting plane faces *a* and *d* transversely of their length so that they may interlock one with the other against relative endwise movement, and consequently, by anchoring the shoe in place against such movement, the cutter is likewise anchored. The anchoring means in the present case comprises a wedge key or pin 17 which is cylindrical in form except that it is slabbed off from one end to the other to provide it with a plane wedging face *h* which is at an acute angle to the axis of said pin. This pin or key is set removably in a cylindrical aperture or socket 18 which extends from the bore 12 of the body to the periphery thereof, and which cuts through the socket 13 or 14 as the case may be. Preferably the socket 18 for the pin is at an acute angle to the faces of the body so that its inner end is located close to one of the faces of the hub 11, as shown in Fig. 5. This makes it possible to force the anchoring pin 17 outwardly by means of a drift pin engaged with its inner end. Each shoe is provided with a transverse groove 19, equal in width to the diameter of the pin 17, the bottom face *i* of which is approximately parallel to the flat face *d* thereof. This face *i* of the groove is adapted to be engaged by the plane beveled face *h* of the pin 17.

In positioning each cutter in the body, the cutter and its associated shoe are brought into facial contact like the two halves of a cylinder, and are inserted endwise in the semi-cylindrical socket 13 or 14 of the body, until the groove or socket 19 of the shoe 16 registers with the socket 18, and then the anchoring pin *h* is inserted in the socket 18 and forced inwardly until it wedges the shoe against the cutter and the cutter against the concave side wall of the socket. As the pin is driven inwardly, it insures the angular adjustment of the shoe and the cutter about their common axis, and the accurate location of the face $a$ of the cutter in reference to the body of the tool.

It would be possible, of course, to form the sockets 18 and to arrange the pins 17 radially of the axis of the body and perpendicular in reference to such axis, but I regard it as preferable to have the axis of the socket tangential to a circle circumscribed about the axis of the body, as shown in Fig. 3, and to have it also inclined from one face of the body toward the other to facilitate its easy removal. The outer portion of each shoe is concaved or cut away, as at $j$, to allow for chip clearance, the face thus provided coinciding with a slightly concave face $k$ formed in the periphery of the body.

With the form of cutters shown, they all may be adjusted until their ends lie in the same parallel plane, the cutting edges $c$ being relied upon for the reduction of the work; or, for cutting slots, the cutters may be alternately projected beyond the end faces of the body, in which event, the angle of the face $a$ and the end wall of the cutter constituting a cutting edge. When used as a slotting tool, the cutters can be alternately moved out the width of one or more of the teeth $f$ thereof, and reground on their end faces, thus maintaining a standard width of cut.

Having thus explained the nature of my said invention and described a way of making and using the same, although without attempting to set forth all of the forms in which it may be made or all of the modes of its use, what I claim is:

1. A rotary milling tool, comprising a disk-like body or holder, provided in its periphery with semi-cylindrical open sockets extending from face to face thereof, semi-cylindrical cutters arranged in said sockets and projecting beyond the periphery of the body, an associated complemental semi-cylindrical shoe for each cutter located in the socket therewith, and a key for locking each shoe and its associated cutter against endwise movement.

2. A rotary milling tool, comprising a disk-like body or holder, provided in its periphery with semi-cylindrical open sockets extending from face to face thereof, a semi-cylindrical cutter and an associated semi-cylindrical shoe, having contacting toothed faces by which they are held against relative lengthwise movement, arranged in each socket, and wedge pins inserted in apertures intersecting said sockets and operatively engaged with said shoes to hold them against dislocation.

3. A rotary milling tool comprising a bored disk-like body or holder provided in its periphery with a plurality of open semi-cylindrical sockets extending from face to face thereof, and with transverse apertures extending from a point near one face of the body at an inclination from the bore to the periphery of the body and intersecting said sockets, a semi-cylindrical cutter and an associated semi-cylindrical complemental shoe arranged in each socket, the shoe being reduced to provide chip clearance for the cutter which projects beyond the periphery of the body and the shoe having a transverse groove, and a key or pin located in each aperture and operatively engaged with the shoe located in the adjacent socket.

In testimony whereof I have affixed my signature.

FRED P. LOVEJOY.